United States Patent
Indyk et al.

(10) Patent No.: US 10,614,806 B1
(45) Date of Patent: *Apr. 7, 2020

(54) DETERMINING APPLICATION EXPERIENCE BASED ON PARALINGUISTIC INFORMATION

(71) Applicant: INTUIT INC., Mountain View, CA (US)

(72) Inventors: Benjamin Indyk, San Diego, CA (US); Igor A. Podgorny, San Diego, CA (US); Raymond Chan, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/058,286

(22) Filed: Aug. 8, 2018

Related U.S. Application Data

(63) Continuation of application No. 15/336,215, filed on Oct. 27, 2016, now Pat. No. 10,049,664.

(51) Int. Cl.
  *G10L 15/22* (2006.01)
  *G10L 15/18* (2013.01)
  (Continued)

(52) U.S. Cl.
  CPC .............. *G10L 15/22* (2013.01); *G10L 15/02* (2013.01); *G10L 15/1815* (2013.01);
  (Continued)

(58) Field of Classification Search
  None
  See application file for complete search history.

(56) References Cited

U.S. PATENT DOCUMENTS

| 5,870,709 A * | 2/1999 | Bernstein ................. G09B 7/04 434/156 |
| 6,584,180 B2 | 6/2003 | Nemoto |

(Continued)

OTHER PUBLICATIONS

Evaluation of Prosodic and Voice Quality Features on Automatic Extraction of Paralinguistic Information; Carlos Toshinori Ishi et al; 2006 IEEE/RJS International Conference on Intelligent Robots and Systems; Year: 2006; pp. 374-379.

(Continued)

*Primary Examiner* — Abul K Azad
(74) *Attorney, Agent, or Firm* — Patterson + Sheridan, LLP

(57) ABSTRACT

Techniques are disclosed for determining application experience of a user based on paralinguistic information determined for the user. One embodiment presented herein includes a computer-implemented method, which includes receiving, at a computing device, one or more audio streams. Each audio stream includes audio from a user interacting with at least one page of an application. The computer-implemented method also includes generating paralinguistic information from at least one of the audio streams. The paralinguistic information characterizes acoustic aspects of the audio stream that are distinct from verbal content of the audio stream. The computer-implemented method further includes determining, from the paralinguistic information, at least a current user sentiment regarding the at least one page, determining, based on evaluating the current user sentiment, that the user is predicted to discontinue use of the application, and taking action to reduce the likelihood of the user discontinuing use of the application.

20 Claims, 10 Drawing Sheets

(51) Int. Cl.
  *G10L 15/02* (2006.01)
  *G10L 25/63* (2013.01)
  *H04L 29/08* (2006.01)
(52) U.S. Cl.
  CPC .............. *G10L 25/63* (2013.01); *H04L 67/20* (2013.01); *H04L 67/22* (2013.01); *H04L 67/327* (2013.01); *G10L 2015/223* (2013.01)

(56) References Cited

U.S. PATENT DOCUMENTS

| | | | |
|---|---|---|---|
| 8,531,501 B2* | 9/2013 | Portman | H04M 3/5133 |
| | | | 348/14.02 |
| 8,949,132 B2 | 2/2015 | Bangalore et al. | |
| 10,049,664 B1* | 8/2018 | Indyk | H04L 67/327 |
| 10,135,989 B1* | 11/2018 | Indyk | H04M 3/5235 |
| 10,192,569 B1* | 1/2019 | Indyk | H04M 3/5183 |
| 2006/0095267 A1 | 5/2006 | Yano et al. | |
| 2012/0016678 A1 | 1/2012 | Gruber et al. | |
| 2016/0021250 A1* | 1/2016 | Kumar | H04M 3/5232 |
| | | | 379/88.01 |

OTHER PUBLICATIONS

Speaker profiling by extracting paralinguistic parameters using mel frequency cepstral coefficients; Sudeep Galgali et al; 2015 International Conference on Applied and Theoretical Computing and Communication Technology (iCATccT); Year: 2015; pp. 486-489.

* cited by examiner

DETERMINING APPLICATION EXPERIENCE BASED ON PARALINGUISTIC INFORMATION

CROSS-REFERENCE TO RELATED APPLICATION & PRIORITY CLAIM

The present application is a continuation of U.S. patent application Ser. No. 15/336,215 with a U.S. filing date of Oct. 27, 2016, which is assigned to the assignee hereof and expressly incorporated herein by reference.

BACKGROUND

The present disclosure relates to techniques for determining a quality of user experience with an application, and more specifically, to techniques for reducing the likelihood of a user discontinuing use of an application based, at least in part, on paralinguistic information captured from voice/speech of the user while the user interacts with the application.

Complex software applications and services are frequently made available to users over computer networks, such as the Internet. For example, software applications used to prepare and file income tax returns are frequently offered as an online service. In addition to generating tax return documents, these online services typically guide a user through a collection of complex interactive workflows in order to prepare a complete, valid income tax return. Further, in attempt to increase user satisfaction with the application, these services generally attempt to maximize the user's tax refund. For example, indicating that the user has a negative refund (i.e., the user owes money to the IRS) can lead to customer dissatisfaction with the online service and decrease customer retention.

Other online services allow users to access software applications used to prepare a variety of other legal and formal documents. For example, online services are available which direct a user through a guided interaction to generate estate planning documents, corporate entity documents, legal filings, etc. Still other complex software applications accessed as an online service include financial service applications which allow users to complete mortgage applications or apply for home, life, or automobile insurance.

In addition to these transactional online services, a variety of complex software tools offer users access to both online services and local client applications, e.g., financial accounting software, video editing or media composition software, software development tools, etc. Such applications may allow users to access application features and user data stored online, regardless of whether the application is installed locally by an end user or accessed as an online service. Once customer data is stored by a service provider, end users can access their data using a variety of clients, including a web browser used to access a software application as a series of web pages, dedicated "thin" client applications, and so-called "apps" accessed using a mobile telephone or computing tablet.

Further, some online services include voice recognition software that can process users' voice/speech. For example, users can interact with the online service with voice/speech to initiate services or processes in the online service, navigate application content provided by the online service, etc. In addition, online services can prompt users to provide feedback with voice/speech. The online services can convert the voice/speech to text (e.g., using natural language processing) to determine a level of user satisfaction with the online service based on the text content. In addition to text content, the online service can monitor users' interaction with the online service by tracking amount of time spent by the user with the service, number of clicks from the user, etc.

BRIEF SUMMARY

One embodiment presented herein includes a computer implemented method for determining application experience of a user. The method generally includes receiving, at a computing device, one or more audio streams. Each audio stream includes audio of a user interacting with at least a first page of an application. The method also includes generating paralinguistic information from at least one of the audio streams. The paralinguistic information characterizes acoustic aspects of the audio stream that are distinct from verbal content of the audio stream. The method also includes determining, from the paralinguistic information, at least a current user sentiment regarding the first page, and determining, based on evaluating the current user sentiment, that the user is predicted to discontinue use of the application. The method further includes determining, based at least on the current user sentiment, an intervention that reduces a likelihood of the user discontinuing use of the application, and interacting with the user according to the intervention.

The method further includes determining the intervention by using a model to evaluate the current user sentiment for the at least one page and the likelihood of the user to discontinue use of the application. The intervention includes a least one of offering a discount, offering assisted support, offering self-support content, and providing a list of content items.

Additional embodiments include a computing device having a processor and a memory storing one or more application programs configured to perform the methods disclosed herein and a computer-readable storage medium storing instructions, which when executed on a processor perform the methods disclosed herein.

DETAILED DESCRIPTION

Figure 1:
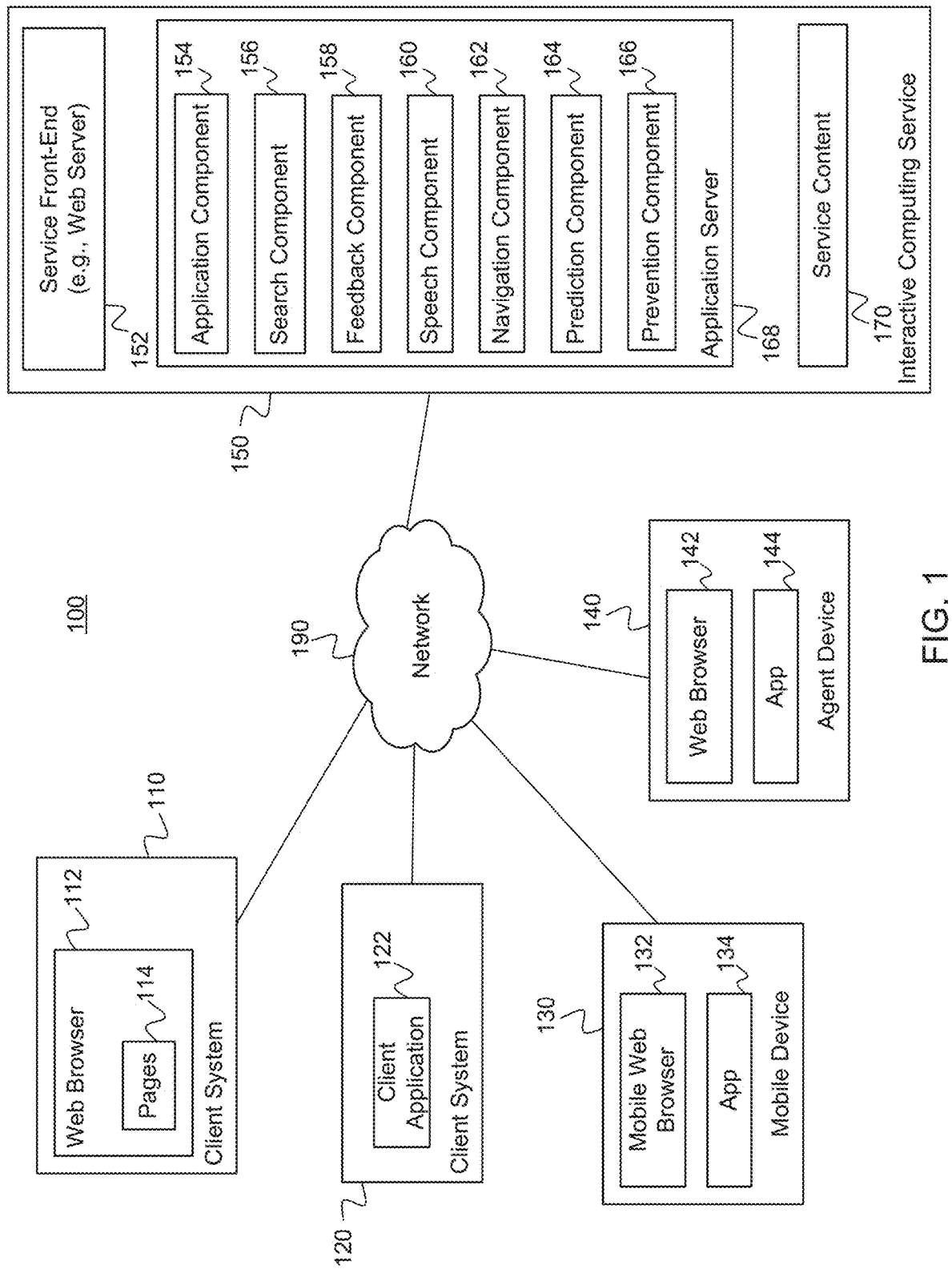
FIG. 1 illustrates an example of a computing environment used to provide an interactive computing service, according to one embodiment.

Embodiments presented herein provide techniques for determining application experience of a user based on paralinguistic information of voice/speech of the user. More specifically, embodiments presented herein can determine sentiment of the user regarding application content and intervene (e.g., to reduce the likelihood of the user discontinuing use of the application) if the determined sentiment satisfies any predefined conditions for intervening.

For example, a user may interact with the software application using a voice-user interface (VUI). That is, a user can use voice/speech to initiate services or processes in the software application. Continuing with the example of an online tax preparation service, a user can use voice/speech to interact with an interactive workflow (provided by the online tax preparation service) in order to prepare and file a tax return, search self-support content (e.g., such as help content, guides, documentation, user-generated content, etc.), navigate the online tax preparation service, and the like. To the extent the user does use their voice to interact with the application, the online service can capture the user's voice/speech as an audio stream and process the audio stream to extract paralinguistic information from the audio stream.

The paralinguistic information characterizes acoustic aspects of the user's voice/speech that are distinct from verbal content of the user's voice/speech. Paralinguistic generally means "alongside linguistics" and therefore deals with those phenomena that are mentioned onto or embedded into a verbal message, including acoustics and linguistics of the verbal message. For example, low level descriptors may be extracted from frames of the audio stream (e.g., 10-30 ms frames). These acoustic low level descriptors may include intonation (pitch, etc.), intensity (energy, Taeger functions, etc.), linear prediction cepstral coefficients (LPCC), perpetual linear prediction (PLP) parameters, cepstral coefficients (Mel frequency cepstral coefficients (MFCCs), etc.), formants (amplitude, position, width, etc.), spectrum (Mel frequency bands (MFB), NMF-based components, MPEG-7 audio spectrum projection, roll-off, etc.), TF transformation (wavelets, Gabor, etc.), harmonicity (harmonics-to-noise ratio (HNR), noise-to-harmonics ratio (NHR), etc.), and/or perturbation (jitter, shimmer, etc.). Further, the linguistic low level descriptors may include linguistic entities (phoneme sequences, word sequences, etc.), non-linguistic strings (laughter, sighs, etc.), and/or disfluencies (false starts, filled/unfilled pauses, etc.). The paralinguistic information may be extracted utilizing known techniques or software, such as, EmoVoice, OpenEar, Yaafe, Voice Search DB with Accent and Tone, VoiceVault, AT&T APIs, etc.

Once extracted, the online service can process the paralinguistic information of the user's voice/speech to determine one or more attribute measures of the user (e.g., such as emotional state, gender, age, etc.). For example, the online service (or application) can compare the low level descriptors extracted from the audio stream to a speech database that stores attributes correlated to different low level descriptors. The low level descriptors can then be matched to different attributes, examples of which include, but are not limited to, gender of the user, age (or age range) of the user, one or more emotional states of the user (e.g., angry, afraid, positive, negative, joyful, happy, bored, alert, tranquil, excited, warm, aggressive, friendly, gloomy, etc.). Note, however, that the attributes are not expected to always be determined correctly. For example, in some cases, the predicted attributes are determined with a probability that they are correct. However, the online service may assign the determined attribute to the user, or if the probability is below a threshold, not assign the determined attribute to the user. In some cases, the online service can prompt the user to input the voice/speech again.

In some examples, the online service may use the sentiment of the user (determined from paralinguistic information of the user's voice/speech) to infer a quality of experience of the user to the application. For example, as described below, the online service can use the sentiment of the user as a behavioral predictor for determining a likelihood of the user abandoning (or discontinuing use of) the application. Assume, for example, that a user is interacting with an interactive workflow provided by the online service to prepare and file a tax return and uses voice/speech to interact with one or more interactive screens (or pages) of the workflow. In this example, the online service can track the user's sentiment for one or more interactive screens of the workflow. In some cases, the online service may enable the tracking of the user's sentiment for only certain interactive screens. For example, the online service may designate certain interactive screens as more important (e.g., such as a welcome page, data import page, deduction page, product payment page, etc.) than other interactive screens, and therefore may consider the sentiment of the user determined for such screens as more reliable predictors of the user's behavior. In some cases, the online service may enable the tracking of the user sentiment for each interactive screen.

In some examples, the online service can use change in user sentiment or change in sentiment between two interactive screens, etc., as separate predictors of the user's experience with the service. For example, the online service may determine that the user is initially in a positive mood (e.g., from paralinguistic information of the user interacting with a first one or more screens), and then determine that the user's mood has changed to neutral (e.g., from paralinguistic information of the user interacting with a second one or more screens). In this example, the online service can predict, based on the change in sentiment, that the user is having a negative experience interacting with the service based on the change in sentiment.

Once the user reaches a predetermined point in the application, the online service may determine a likelihood of the user to abandon the service based on the user's sentiment determined (based on paralinguistic information) for the interactive screens the user previously interacted with. For example, as described below, using one or more analytical models (e.g., such as a propensity model), the online service can compute a score indicating the probability of the user to abandon the service based on the user's sentiment associated with the interactive screens. If the online service determines the probability satisfies a predetermined condition (e.g., exceeds a threshold), the online service can determine that there is a high likelihood that the user may abandon the service (e.g., by not paying for application content and/or services provided by the online service). In addition, the online service can predict based on the user sentiment a measure of customer retention (e.g., whether the customer is going to use the service at a later point in time).

In addition to the user sentiment (determined from paralinguistic information), the online service can also track other user behavioral predictors, examples of which include, but are not limited to, a count of user clicks for each interactive screen, ratio of unique page clicks to total page clicks, amount of time spent for each interactive screen, feedback from the user, relationship of user to the application (e.g., new user, existing user, etc.), and the like. However, compared to these conventional behavioral predictors, the information determined from paralinguistic information can provide a more accurate measure of a user's experience with respect to application content. For example, while it may be possible in some cases to infer some degree of user sentiment based on the number of clicks for each interactive screen, using paralinguistic information to determine user sentiment for each interactive screen may provide a more accurate measure of the user's sentiment to application content than the actual number of clicks received from the user.

For example, assume that an online tax-preparation service determines a user provided a low number of clicks (e.g., the number of clicks are below a threshold) for one or more interactive screens of a tax preparation workflow provided by the service. In such a case, the online service may infer from the low number of clicks, that the user has a high level of satisfaction with the application (e.g., the user is experienced with features of the application, is not dissatisfied with content of the application, etc.). At the same time, assume that for at least some of the interactive screens, the user spoke sets of words, such as "Where is the data import feature?," "How much does this application cost?," "Is that my refund?," etc. In this example, the user may speak such sets of words with a negative tone (indicating the user is in a negative mood or is having a frustrating experience with the application) that may not be detectable by the number of clicks received from the user (or other behavioral predictors) alone. As such, by determining experience of the user to the application based on user sentiment (from paralinguistic information of the user's voice/speech, as opposed to other methods) to the application content, the online service may more accurately determine probability of the user to abandon the service. In some examples, however, the online service can use these conventional behavioral predictors in addition to the user sentiment from paralinguistic information to determine probability of the user to abandon the application (e.g., the analytical may factor in user sentiment determined from paralinguistic information in addition to user clicks per screen, amount of time spent on each screen, etc.).

In some examples, once the online service determines that the probability of the user to abandon the online service exceeds a threshold, the online service can take proactive steps to reduce the likelihood of the user abandoning the service. For example, in some cases, the online service can intervene while the user is interacting with the application (i.e., in real-time) by offering the user a discount (or other monetary incentive), offering assisted support to the user (e.g., via links for chat session, telephone number, etc.), displaying a list of content items to help the user, etc. In some cases, the online service can intervene after the user has finished interacting with the application (i.e., off-line), e.g., such as by contacting the user via e-mail at a later time.

In some examples, the online service can also determine a type of intervention to use based on the user sentiment (determined from paralinguistic information) in order to reduce the likelihood of the user abandoning the service. For example, the online service can use a second analytical model to determine the type of intervention for a given user that produces the greatest likelihood that the user will not abandon the service. As described below, the second analytical model may be an uplift model that uses the probability score of the user to abandon in addition to one or more attributes of the user (e.g., user sentiment, age, gender, etc.) to determine the type of intervention to use for the user.

Advantageously, by monitoring users' paralinguistic data while the users interact with the online service and determining sentiment of the users to application content, embodiments herein can identify the users that are at risk of abandoning the online service and proactively intervene to reduce the likelihood of those users discontinuing use of the service. In this manner, the techniques presented herein can increase the retention of customers of the online service.

Note, certain embodiments are described herein using an online tax-preparation service as an example of computer software and an online software service, etc., that predicts a user's application experience based on paralinguistic information of the user's voice/speech. One of ordinary skill in the art will recognize that the techniques described herein may be adapted for use by a broad variety of software applications, online or web services, software features, or support services where users can use voice/speech to interact with the software. Additionally, it should be noted that although, in certain examples described herein, the computing device that captures the audio stream is described as performing certain tasks (e.g., extracting paralinguistic information, speech recognition, action selection, etc.), such tasks may be performed by one or more additional computing devices that the computing device that captures the audio stream is in communication with (e.g., via a wired or wireless network), or vice versa. For example, the audio stream, control signals, and information for display may be communicated between the computing devices, such as described with respect to FIG. 1.

FIG. 1 illustrates an example of a computing environment 100 used to provide an interactive computing service 150, according to one embodiment. As shown, the computing environment 100 includes client systems 110, 120, a mobile device 130, an agent device 140, and an interactive computing service 150, which are each connected to a network 190. The network 190, in general, may be a wide area network (WAN), local area network (LAN), wireless LAN (WLAN), personal area network (PAN), a cellular network, etc. In a particular embodiment, the network 190 is the Internet.

Client systems 110, 120 are included to be representative of a general purpose computing systems, such as a desktop or laptop computer hosting applications used to access the interactive computing service 150. For example, client system 110 includes web browser 112 used to access the interactive computing service 150 by rendering web pages 114 received from the interactive computing service 150. Similarly, client system 120 includes a client application 122. The client application 122 is included to be representative of a component of a client server application (or other distributed application) which can communicate with the interactive computing service 150 over network 190. Client application 122 may be a "thin" client where the processing is largely directed by the client application 122, but performed by computing systems of the interactive computing service 150 or a conventional software application installed on client system 120. Mobile device 130 is included to be representative of a variety of computing devices, such as a mobile telephone or computing tablet. As shown, the mobile device 130 may access the interactive computing service 150 over network 190 using a mobile web browser 132 or local application or "app" 134 executed on the mobile device 130. Agent device 140 is included to be representative of a variety of computing devices, such as a desktop, mobile telephone, computing tablet, laptop, etc. Agent device 140 may access the interactive computing service 150 over network 190 using web browser 142 or "app" 144 executed on the agent device 140.

In one embodiment, web browsers 112, 132, 142, and applications 122, 134, 144 communicate with the interactive computing service 150. For example, referring to client systems 110, 120 and mobile device 130, in the case where interactive computing service 150 offers a tax-preparation service, web browsers 112, 132, client application 122, and application 134 may provide software which guides a user through preparing a tax return as well as provide the user with access to a variety of related features (e.g., self-support content, assisted support content, etc.) available from the interactive computing service 150. Continuing with the tax preparation example, such features may include the ability to file a prepared return via an interactive workflow, to search for help content, user generated content, etc. related to tax topics, to post questions and answers to questions about the service using an online community, or to provide feedback about the usefulness, quality or relevance of content provided by the interactive application or members of the online community. As described herein, in one embodiment, paralinguistic information from voice/speech of a user may be used to determine experience of a user to the interactive computing service 150.

Referring to agent device 140, web browser 142 and application 144 may provide software which allows a support agent to provide support or assist users with accomplishing a particular task. For example, a support agent can use web browser 142 and/or application 144 to access features or content of the interactive computing service 150 that may not be available to users in order to provide support to users. Such features, for example, may include detailed product documentation, access to user accounts for the online service, etc. In some embodiments, applications 122, 134, and 144 may support screen sharing (e.g., as one type of assisted support). For example, with screen sharing, the support agent can use application 144 to observe and control application 122 on client system 120, application 134 on mobile device 134, etc.

As shown, the interactive computing service 150 includes a service front-end 152, an application server 168, and a service content database 170. In this example, the interactive computing service 150 is generally modeled as a web server (i.e., service front end 152), an application server 168, and a database (i.e., service content database 170). Of course, other software architectures or distributed application frameworks could be used. Service front-end 152 and application server 168 are included to be representative of physical computing systems, as well as representative of virtual machine instances deployed to a computing cloud. Service front end 152 may communicate with application server 168 to respond to requests from applications on client systems 110, 120, mobile device 130, and agent device 140.

The application server 168 includes an application component 154, search component 156, feedback component 158, speech component 160, navigation component 162, prediction component 164 and prevention component 166. Continuing with the example of a tax preparation service, the application component 154 may provide one or more software applications which are used to guide a user in preparing a tax return and to access related features and services, e.g., to interact with self-support content or assisted support content. In one embodiment, the application component 154 may respond to requests from clients by generating hypertext markup language (HTML) and related content passed to clients (via the service front-end 152) and rendered as a user interface (e.g., forms, text fields, and so on, along with scripts or applets executed by a web browser). In some cases, the application component 154 may interact with other components of the application server 168 (e.g., such as prediction component 166) to pass HTML content to clients. In some cases, the application 122 running on the client 120, the application 134 running on the mobile device 130 and/or the application 144 running on agent device 140 could generate information content to present data retrieved from the application server 168. In general, the application component 154 may be implemented using any suitable software programming language, application framework, web service solution stack, virtual application containers, etc., in order to present application features and content to a client.

In some embodiments, the application server 168 may include one or more graphical user interface (GUI) components that interactive computing service 150 can present on client systems 110, 120, mobile device 130 and agent device 140, based on whether a user is interacting with a workflow (via application component 154), searching for information content (e.g., via search component 156 and/or speech component 160), providing feedback for information content (e.g., via feedback component 158), etc. The GUI components may include, for example, HTML components or code that generates HTML components that can be passed to client systems 110, 120, mobile device 130 and agent device 140 and rendered as a user interface. The GUI components may additionally include instructions executable by client systems or mobile devices to display a user interface. The GUI components may additionally include instructions executable by client systems 110, 120, mobile device 130 and agent device 140 to display a user interface using language-specific or operating system-specific GUI components (e.g., instructions for displaying Win32 forms or similar components on other operating system platforms, Abstract Window Toolkit or Swing API components on the Java platform, and so on). Generally, instructions capable of rendering a GUI on client systems 110, 120, mobile device 130 and agent device 140 may include computer executable code generated from compiling and/or interpreting C (or variants thereof), Java, PHP, Ruby, HTML, javascript, Python, AJAX, VBscript, and other programming or scripting languages used to compose and present a GUI. In an example tax preparation application, application server 168 components may include screens for prompting a user for personal information (e.g., name, address, social security number), income information (from W-2s, 1099s, K-1s, and so on), and various deductions and credits that the user may qualify for, structured feedback (e.g., up-down votes, star ratings, etc.), voice-of-customer feedback, etc. The prompts may be for input of such information via voice/speech of the user. Additionally, the application server 168 components may include prompts (e.g., pop-ups or other interventions) that display application content (e.g., generated by prediction component 164) to reduce the likelihood of the user abandoning the interactive computing service 150.

In some cases, the GUI on client systems 110, 120, mobile device 130 and/or agent device 140 may include a prompt (e.g., icon, text, button, etc.) that requests a user to speak (e.g., ask a query, speak a command, etc.), for example, using natural language. The client systems 110, 120, mobile device 130 and/or agent device 140 may receive the audio stream of the speech of the user, such as via a microphone coupled to or integrated with the client systems 110, 120, mobile device 130 and/or agent device 140. The client systems 110, 120, mobile device 130 and/or agent device 140 may transmit the audio stream, via the network 190, to the application server 168.

The speech component 160 may be used to identify the text (e.g., words, query, etc.) of the audio stream of the voice/speech of the user (e.g., by utilizing speech recognition techniques to convert speech to text). Further, the speech component 160 may be configured to generate paralinguistic information from the audio stream and determine (or predict) one or more attribute measurements of the user based on the paralinguistic information (e.g., by utilizing known techniques as discussed herein). The speech component 160 may be configured to provide such identified text and one or more attributes of the user (or paralinguistic information) to the other components of the application server 168 (e.g., such as prediction component 164, prevention component 166, etc.).

In one example, the speech component 160 can be configured to track sentiment of a user interacting with the interactive computing service 150. For example, assuming the user is progressing through an interactive workflow to prepare and file a tax return, the speech component 160 can generate, for each interactive screen, paralinguistic information from audio of the user and determine an array of sentiment of the user to application content for the interactive screen based on the paralinguistic information. In one embodiment, the speech component 160 can determine one or more than one emotional state for each interactive screen, based on the paralinguistic information. Put differently, the speech component 160 can determine an array of measures of emotional states for each interactive screen. The speech component 160 can store the array of emotional states (e.g., in a database) for retrieval by other components of the interactive computing service or provide the array of emotional states in response to a request for the emotional states (e.g., by other components of the interactive computing service). In addition, the speech component 160 can determine other user attributes (e.g., gender, age (or age range), etc.) based on paralinguistic information of voice/speech of the user captured from the interactive screens. The speech component 160 may store the determined attributes in a user profile in a database for interactive computing service 150. While a user interacts with the interactive computing service 150, the speech component 160 can continually update the user profile with information determined from paralinguistic information.

The search component 156 may be used to allow users to search for content items or features available from the interactive computing service 150. For example, the search component 156 may evaluate service content database 170 to identify content items responsive to a user query (e.g., based on text from the speech component 160) received as voice/speech of the user. In such a case, the search component 156 could identify a variety of content items or services hosted on the interactive computing service 150, such as user guides, feature documentation, as well as user generated content such as questions posted to an online community of users, user blogs, or syndicated forum posts, etc. and/or identify other actions to take, such as routing a user to assisted support, routing a user to receive feedback from the user, etc. In some cases, the search component 156 may use keywords specified in the user query (e.g., as identified by the speech component 160) to identify content hosted on the interactive computing service 150. For example, assume a user specifies keywords "tax return" in a search for how to prepare a tax return. In response, the search component 156 may identify content items in the server content database 170 that include the keywords "tax return" specified by the user.

The feedback component 158 may be used to capture feedback regarding user experience. For example, a user interacting with the online service may at times be prompted to provide feedback regarding the usefulness of certain features and/or content provided by the online service. Such feedback may be provided in the form of structured feedback (e.g., binary up/down votes, star ratings, etc.), more detailed unstructured feedback (e.g., user comments, voice/speech, etc.), or in general any other form that indicates whether the user was satisfied or dissatisfied with the online service. As described below, the prediction component 164 may use such feedback in addition to the user sentiment (determined from paralinguistic information) to determine the user's probability to abandon the interactive computing service 150 and/or determine the set of interventions to use to reduce likelihood of the user to abandon the interactive computing service 150.

The navigation component 162 may be used to track behavior of the user while the user is interacting with the interactive computing service 150. For example, the navigation component 162 can monitor, for each interactive screen visited by the user, the number of clicks for the interactive screen, the amount of time spent on each interactive screen, whether the user provided feedback for the interactive screen, etc. The navigation component 162 may store the user activity indicators in a database (e.g., in interactive computing service 150) for use by other components of the service 150 (e.g., such as prediction component 164).

The prediction component 164 may be used to predict likelihood of the user to abandon the application given the user's sentiment to particular application content. The prediction component 164 may receive (from the speech component 160) an array of user sentiment determined from paralinguistic information of the user's voice/speech for a number of interactive screens and use a first predictive model to compute a user abandonment score based on the array of user sentiment from each interactive screen. The user abandonment score may indicate a likelihood (or probability) of the user to abandon or discontinue use of the application (e.g., by not paying for the application). As described below with respect to FIG. 3, in some embodiments, the first predictive model may be a propensity model that predicts the probability of the user to abandon the interactive computing service 150.

In one embodiment, the prediction component 164 may compute the user abandonment score at a designated interactive screen provided by the interactive computing service 150. For example, assuming the user is progressing through an interactive workflow to prepare a tax return, such a designated screen may be the page of the tax-preparation service where the user decides whether to pay for the service 150 (e.g., the print-file screen of the tax-preparation service). In another example, the designated screen may correspond to other pages of the tax preparation service (e.g., such as the welcome screen, data import screen, tax deduction screen, etc.).

In one embodiment, the prediction component 164 may compute the user abandonment score at an initial interactive screen, and continually update the abandonment score while the user interacts with the interactive computing service 150. If the prediction component 164 determines, for any given interactive screen, that the abandonment score exceeds a threshold (indicating the user is at risk of abandoning the application), the prediction component 164 can interact with the prevention component 166 to prevent the user from abandoning the application.

In cases where the prediction component 164 determines the user abandonment score is above a predetermined threshold, the prediction component 164 can determine one or more interventions to use to reduce the likelihood of the user abandoning use of the interactive computing service 150. For example, the prediction component 164 can use a second predictive model to determine a type of intervention to use for the user. Such interventions can include offering the user the ability call customer service, offering the user the option for a support agent to control the user's device to aid the user in solving a problem, providing search results to the user (e.g., before the user searches for them), providing the user a help article, providing the user a set of help articles (e.g., with a link and the ability to search the help articles), making certain application content more prominent on the user's interface, etc.

To determine the type of intervention, the prediction component 164 may use the second predictive model to evaluate the array of user sentiment (per interactive screen), the user abandonment score, other user attributes (e.g., such as age, gender, occupation, location, etc.), user feedback, user activity indicators (e.g., number of clicks per screen, etc.), etc. As noted, the second predictive model may be an uplift model (or incremental response model) that predicts the likelihood that an individual behavior will be influence by a stimulus, intervention, or treatment to a particular user attribute (e.g., such as user sentiment).

In some examples, the prediction component 164 can use the second predictive model to determine when to intervene with a user interacting with the application, based on the user sentiment (determined from the paralinguistic information). For example, in cases where a user visits a large number of interactive screens provided by the interactive computing service 150, the prediction component 164 may weight the sentiment determined for the user for certain screens differently compared other screens. For example, for an online tax preparation service, the prediction component 164 may weight sentiment determined from the welcome screen, import data screens, print/file screen, etc. higher than sentiment determined from other screens provided by the online tax preparation service.

In addition, the prediction component 164 can use the second predictive model to determine a level of intervention to use for a user interacting with the online service, based on the user sentiment (determined from the paralinguistic information). For example, based on the user sentiment and other user attributes, different types of interventions may be sufficient to reduce the likelihood of the user abandoning the interactive computing service 150. Assuming, for example, that the prediction component 164 determines both that offering the user a discount and offering the user assisted support with a particular feature may reduce the likelihood of the user abandoning the service, the prediction component 164 may choose to offer the user a discount (e.g., as opposed to offering the user assisted support). In some embodiments, the prediction component 164 can make such a determination based on a cost of the type of intervention. Continuing with the above example, the prediction component 164 may choose to offer the discount because it may be less expensive than offering the user assisted support. In another example, assuming the prediction component 164 determines to offer the user help as a type of intervention, the prediction component 164 can determine the level of help to provide based on the cost of the help (e.g., a phone call with a support agent may be more expensive than a chat session with a support agent, which may be more expensive than a direct link to self-support content, and so on). Once the prediction component 164 determines a set of interventions, the prediction component 164 can provide the interventions to the prevention component 166.

The prevention component 166 may be used to intervene with the user that is interacting with the application. As noted, the prevention component 166 may use the set of interventions (received from the prediction component 164) to reduce the likelihood of the user abandoning the service. In one embodiment, the prevention component 166 can intervene in real-time (e.g., while the user is interacting with the interactive computing service 150). In one embodiment, the prevention component 166 can intervene at a later time (e.g., the next day, next week, etc.) by contacting the user via e-mail, phone, etc.

Based on the intervention, the prevention component 166 can prompt the user (e.g., via an icon, button text, panel, etc.) with application content, features and/or services provided by the interactive computing service 150. For example, if the intervention is a discount, the prevention component 166 can prompt the user via a pop-up message with text offering the user a discount. If the intervention is offering the user assisted support, the prevention component 166 can produce a help panel on the user's interface that shows a phone number, chat message, etc. The prevention component 166 can interact with one or more components of the application server 168 (e.g., application component 154) and/or web server 152 to modify and alter application content on the user's interface.

Figure 2:
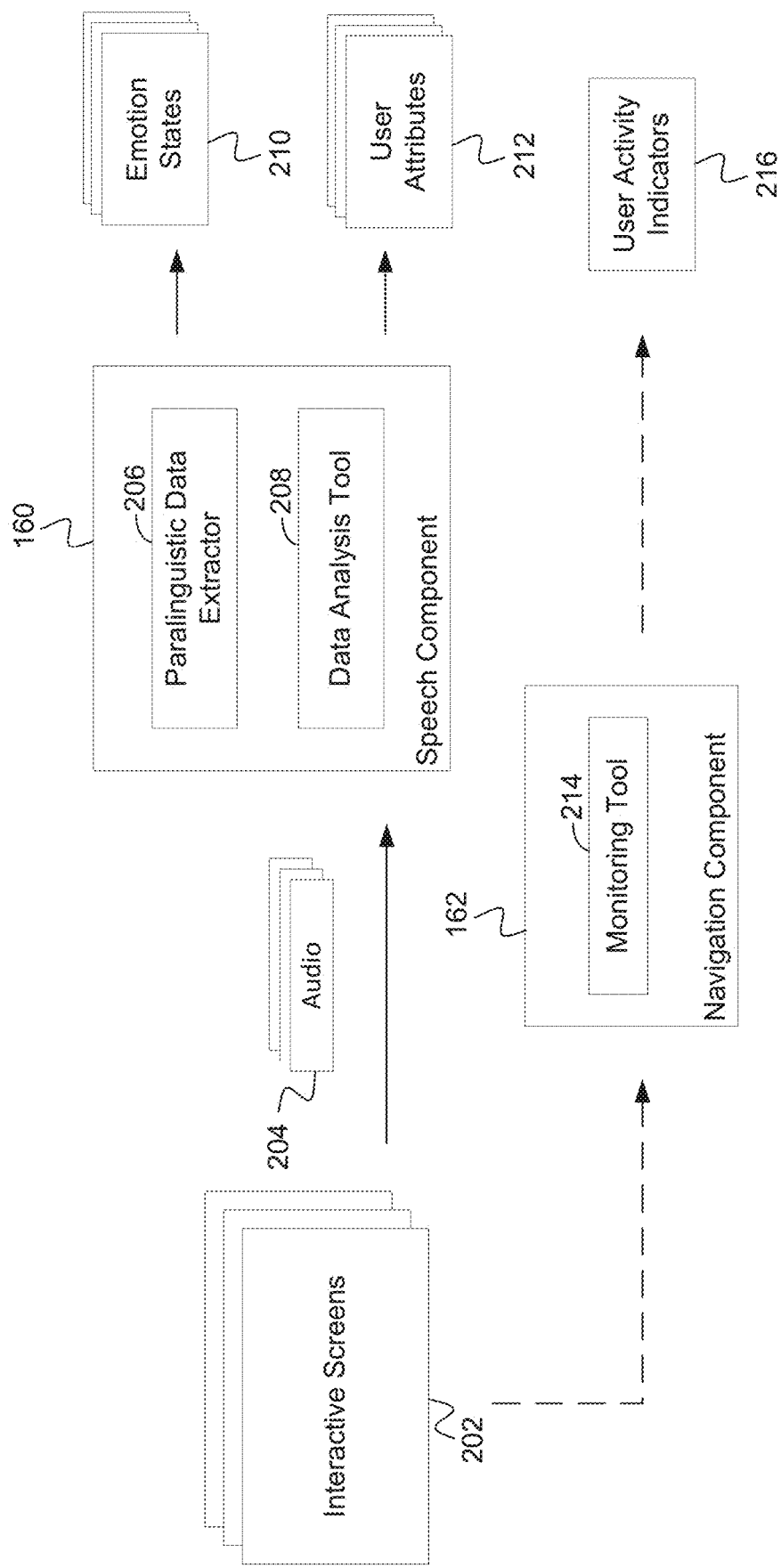
FIG. 2 illustrates components of the interactive computing service used to determine attributes of a user based on paralinguistic information from the user's voice/speech, according to one embodiment.

FIG. 2 further illustrates the speech component 160 and navigation component 162 described relative to FIG. 1, according to one embodiment. As shown, the speech component 160 includes paralinguistic data extractor 206 and data analysis tool 208. The speech component 160 may track a user interacting with one or more interactive screens 202 provided by the interactive computing service 150, and detect audio 204 of the user for each interactive screen 202. Assuming interactive screens 202 are associated with a tax preparation workflow, audio 204 may include words indicative of a query (e.g., "What is my tax bracket?"), words indicative of a command (e.g., "Please continue to next page?"), words in response to a prompt on an interactive screen (e.g., "Yes" or "No"), etc.

The speech component 160 can use paralinguistic data extractor 206 to generate (or extract) paralinguistic information from the audio 204 and use data analysis tool 208 to predict one or more user attributes based on the paralinguistic information. For example, as shown, the speech component 160 can determine an array of measures of user emotional states 210 for each interactive screen (e.g., one or more emotional states per screen) and/or other user attributes 212 (e.g., age, gender, etc.) based on the paralinguistic information from the user's voice/speech. In one example, the speech component 160 may determine each emotional state as a score with a value ranging between $-1$ to $1$, where $1$ is associated with high positive emotional state and $-1$ is associated with a negative emotional state. In general, however, the speech component 160 can use any other suitable range of scores, e.g., 0 to 10, 1 to 100, and so on.

In some embodiments, the speech component 160 can use speech recognition (e.g., using known techniques or software, such as, natural language processing, Hidden Markov models, neural networks, deep feedforward and recurrent neural networks, etc.) on the audio stream to extract words spoken by the user. The words extracted from the audio stream may be indicative of one or more topics that can be provided to other components of the interactive computing service 150.

In addition to tracking user sentiment, the interactive computing service 150 can use the navigation component 162 to track other activity of the user for each interactive screen 202. For example, the navigation component 162 includes monitoring tool 214, which can track the number of clicks for each interactive screen, ratio of unique page clicks to total page clicks, amount of time spent for each interactive screen, etc. The navigation component 162 may store the user activity indicators 216 (e.g., in a database) for use by other components of the interactive computing service 150.

Figure 3:
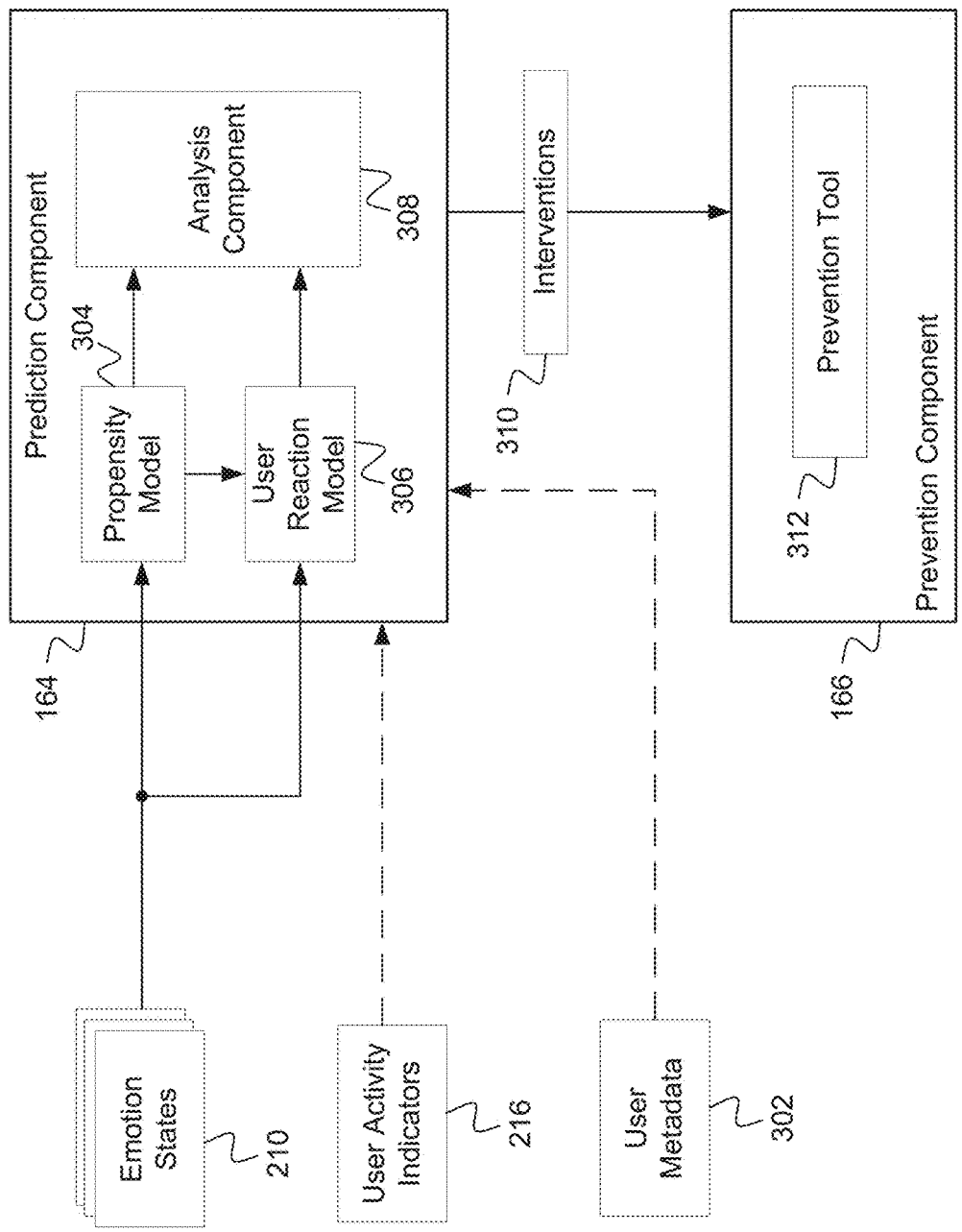
FIG. 3 illustrates components of the interactive computing service used to determine likelihood of the user to abandon the interactive computing service and determine one or more interventions to prevent the user from abandoning the interactive computing service, according to one embodiment.

FIG. 3 further illustrates the prediction component 164 and the prevention component 166, described relative to FIG. 1, according to one embodiment. As shown, the prediction component 164 includes propensity model 304, user reaction model 306 and analysis component 308. The prediction component 164 receives the array of sentiment (or emotion states) 210 for each interactive screen (e.g., from speech component 160), user activity indicators 216 (e.g., from navigation component 162) and/or user metadata 302.

User metadata 302 may include other attributes, such as age, gender, occupation, how long the user has been using the application, etc. In one example, one or more of the attributes may be determined from paralinguistic information of the user's voice/speech (e.g., user metadata 302 may include user attributes 212). At the same time, some of the user metadata 302 may be determined from the user's previous interaction with the interactive computing service 150 (e.g., the user may have provided personal information, employment information, location information, and other details to the interactive computing service 150 during the current interaction and/or prior interaction).

In some cases, some the user metadata 302 may be determined from a profile of the user stored in a database hosted by the interactive computing service 150. In one embodiment, the user profile may be "unified" user profile maintained by the interactive computing service for different applications hosted by the interactive computing service 150. For example, the interactive computing service 150 could provide financial service applications, tax preparation applications, data management applications, etc., and a user may have a single profile that is associated with the different applications. In one embodiment, user metadata 302 can also include feedback (e.g., structured and/or unstructured feedback) received from the user.

The user attributes (e.g., gender, age, etc.) associated with the "unified" profile may be less accurate than the user attributes derived from paralinguistic information of the user interacting with the online service. For example, a wife working on a joint tax return may use an account registered to her husband's name. In this case, the "gender" attribute associated with the account will indicate "male." However, as noted, the speech component 160 can determine from paralinguistic information of the wife interacting with the interactive computing service 150 that the "gender" of the current user is "female."

In response to receiving the user's emotional states 210 (either alone or in addition to user activity indicators 216 and user metadata 302), the analysis component 308 can evaluate the received information with propensity model 304 to determine a user abandonment score that indicates probability of the user to abandon the interactive computing service 150. The propensity model 304 may have been trained over historical user data, including historical user sentiment data and historical user actions (e.g., whether the users adopted the application, discontinued use of the application, used technical support, etc.). For example, to obtain the historical data, the interactive computing service 150 can track interactions between a random set of users and the application for a period of time to collect sentiment and information associated with the use of the application.

Once collected, the interactive computing service 150 can train the model with the historical data using one or more techniques such as regression, logistic regression, decision trees, artificial neural networks, support vector machines, linear regression, nearest neighbor methods, distance based methods, naïve Bayes, linear discriminant analysis, k-nearest neighbor algorithm, etc. Such techniques may be used to identify correlations or other mathematical, statistical, or logical relationships between actions of a user (e.g., adoption, discontinued use, etc.) and sentiment of the user for different interactive screens. Assume, for example, that upon evaluating the historical data with one or more of the above techniques, it is determined that, at a particular interactive screen (e.g., data-import screen) provided by the service, a large number of users expressed a particular sentiment (e.g., frustration) above a threshold. Further assume that it is at this particular sentiment threshold that users from the historical data set began to abandon the service. In this reference example, the above correlation between the frustration level on the data-import screen expressed by users and those users' subsequent abandonment can be used to train the propensity model 304 to predict other similar situations. Note, that the training of the propensity model 304 may also account for the importance of the interactive screens (e.g., different weights may be given to different pages of the online service), type of user (e.g., based on one or more user attributes), whether the user is an experienced user of the online service, etc.

The abandonment score obtained from the propensity model 304 in addition to emotional states 210 can be input to a user reaction model 306. For example, the analysis component 308 may evaluate the information with the user reaction model 306 to determine a type of intervention(s) 310 (e.g., when to intervene and how to intervene) for the user. In one embodiment, the user reaction model 306 is an uplift model (or incremental response model) that is used to predict (based on the user abandonment score, emotion states 210, user activity indicators 216 and/or user metadata 302) a set of interventions that reduce the likelihood of the user abandoning the interactive computing service 150.

The uplift model 306 may have been trained over a historical data set that includes historical interventions used for users and the users' response to the interventions. In one embodiment, the historical data set for training of the uplift model 306 may be obtained from the historical data set used to train the propensity model 304. For example, the interactive computing service 150 can perform marketing inventions on users in the historical data set that interact with a designated page (e.g., print-file page) to generate a training data set that includes the reaction of the users (given the users' sentiment to prior interactive screens provided by the interactive computing service 150) to the interventions. Once obtained, the interactive computing service 150 can use one or more of the above techniques (e.g., used for the propensity model 304) to identify correlations or other mathematical, statistical, or logical relationships between actions of a user (e.g., adoption, discontinued use, etc.) on a given interactive screen and sentiment of the user determined for different interactive screens the user interacted with.

Once the prediction component 164 determines interventions 310, the prediction component 164 provides the interventions 310 to the prevention component 166. The prevention component 166 includes prevention tool 312, which is configured to select and present information content on the user's interface (e.g., for client systems 110, 120, mobile device 130, etc.). For example, the prevention component 166 can provide prompts or modify user interfaces based on the interventions 310. In one embodiment, the prevention component 166 may intervene with the user (e.g., in real-time) during the user's interaction with the interactive computing service 150. In one embodiment, the prevention component 166 may intervene with the user (e.g., off-line) after the user is done interacting with the interacting computing service 150. For example, the prevention component 166 can offer the user a discount or coupon for a future interaction with the interactive computing service 150, via e-mail, telephone, etc.

Advantageously, the techniques presented herein can more accurately detect (e.g., compared to conventional methods) when a user is at-risk of abandoning the interactive computing service, and proactively intervene to reduce the likelihood of the user abandoning the interactive computing service.

Figure 4A:
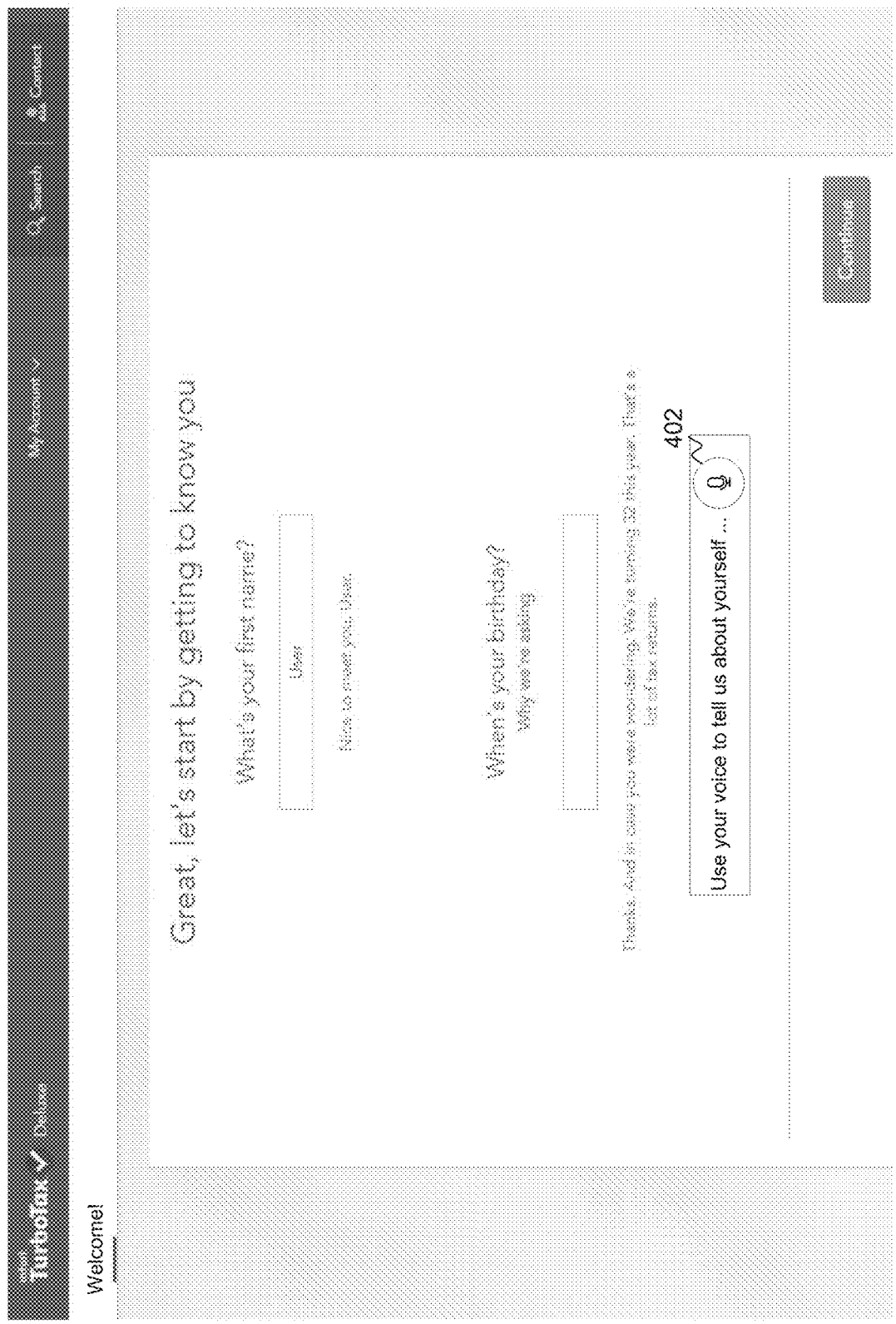
FIGS. 4A-4C illustrate example interactive screens of an interactive workflow provided by the interactive computing service, according to one embodiment.
Figure 4B:
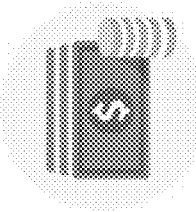
Figure 4C:
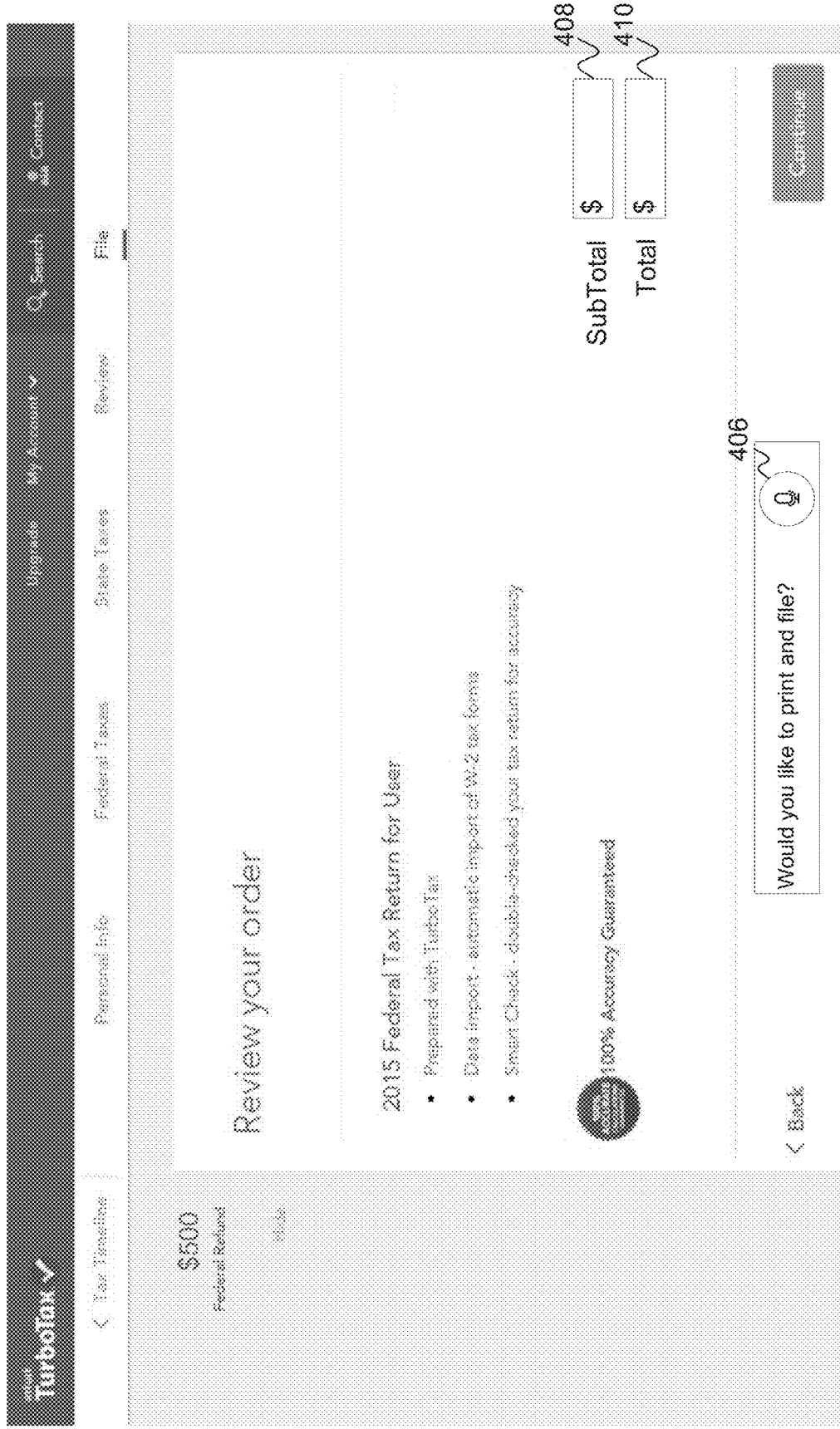

FIGS. 4A-4C illustrate example interactive screens associated with an interactive workflow that allow a user to input voice/speech to control the interactive workflow (e.g., initiate services/processes of the workflow, input information into the workflow, etc.). As shown in FIG. 4A, for an initial welcome screen, a user is given a prompt to use their voice/speech to control the software application (e.g., online service 150), as displayed on a device (e.g., mobile device 130). The user, for example, may provide an input (e.g., touch on a touch screen of the mobile device 130) at an icon 402 to cause the mobile device 130 to accept voice/speech of the user as input. Such voice/speech provided for welcome screen in FIG. 4A may include information about the user. The software application may determine a number of attributes of the user, for example, based on text converted from the user's voice/speech and/or paralinguistic information of the user's voice/speech. At a later point in the interactive workflow, the software application may display a screen (e.g., data import screen) as shown in FIG. 4B on the mobile device 130 prompting the user (via icon 404) to begin speaking. Still further, the user may further be prompted to provide additional voice/speech input for another screen (e.g., print/file screen) via icon 406 in FIG. 4C.

In one embodiment, the screen shown in FIG. 4C may be a designated page that the software application computes the user's likelihood to abandon the application (e.g., based on the user's sentiment from screens in FIGS. 4A-4C). For example, as discussed above, for each interactive screen that the user provides voice input for, the software application can extract paralinguistic information from the voice input and determine the user's sentiment to application content for the particular interactive screen. Referring to FIGS. 4A and 4B, the user may speak words such as "My name is User," or "Yes, I would like to input data" that indicate the user is having a frustrating or negative experience with the application. Referring to FIG. 4C, the user may speak words such as "Is that my tax refund," with one or more paralinguistic cues that indicate the user is dissatisfied (or frustrated) with the amount of the tax refund. In such a case, when the user reaches the screen shown in FIG. 4C, for example, where the user has to decide whether to pay for services and/or features provided by the software application (indicated by boxes 408 and 410), the software application may determine to intervene if the user's abandonment score determined from the user's sentiment from the interactive screens satisfies a predetermined condition for intervening (e.g., is above a threshold).

As noted, in some embodiments, the software application can track the change in user sentiment for the screens shown in FIGS. 4A-4C, and use the change in sentiment as a predictor of the user's experience with the software application. For example, if the user has a positive sentiment for the screens in FIGS. 4A and 4B, and the user's sentiment changes to negative for the screen in FIG. 4C, the software application may predict that the user is having a negative experience, notwithstanding the positive sentiment associated with the previous interactive screens. In some cases, for example, the software application may consider the interactive screen that indicates the user's tax refund (e.g., FIG. 4C) as more important than other interactive screens (e.g., FIGS. 4A-4B). Thus, the software application may give a higher weight to the sentiment determined from paralinguistic information of the user interacting with this screen when predicting the likelihood of the user to abandon the application.

Figure 5:
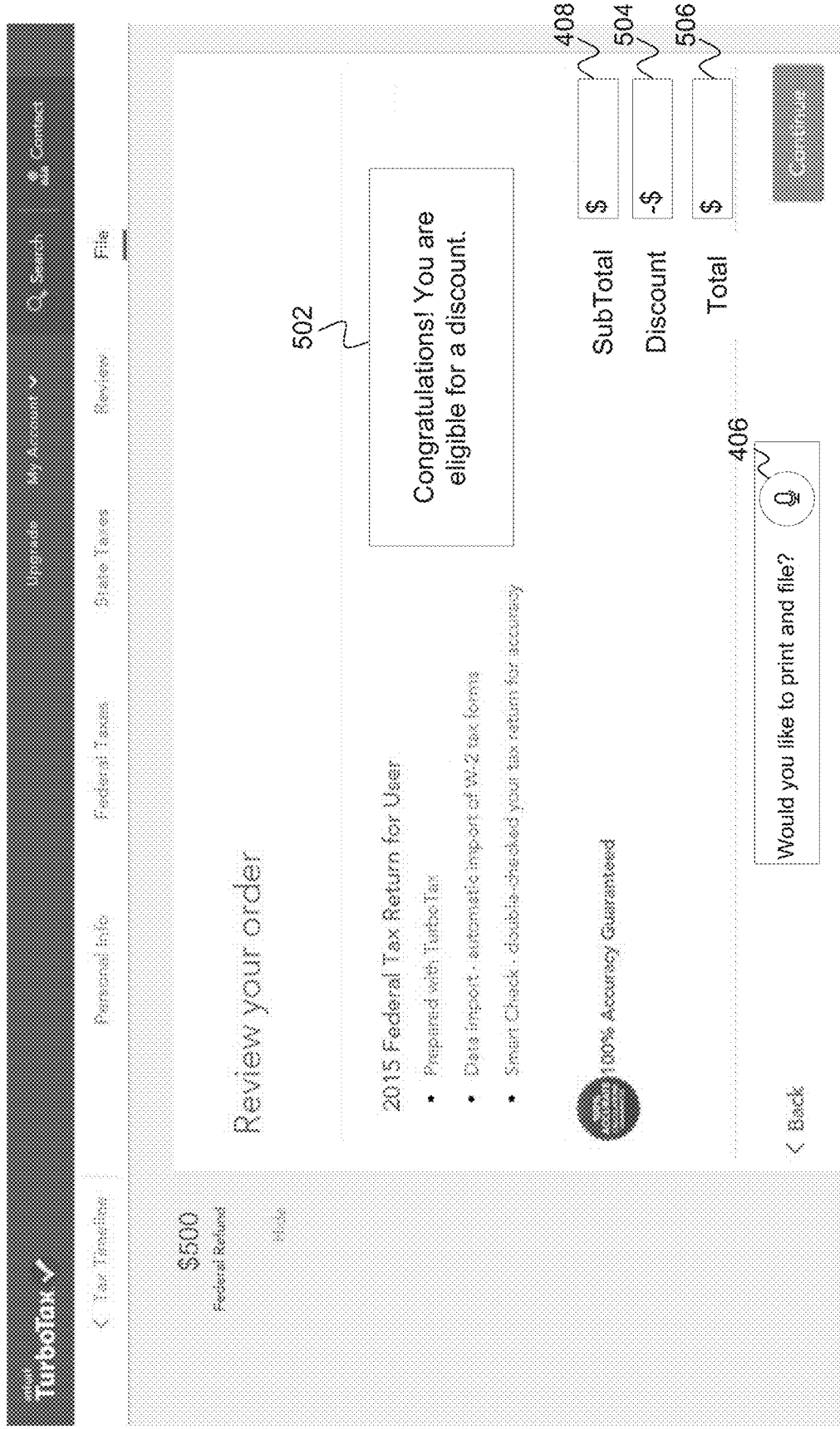
FIG. 5 illustrates an example intervention used to prevent the user from abandoning the interactive computing service, according to one embodiment.

As noted, in cases where the abandonment score does satisfy the predetermined condition, the software application can determine at least one intervention to use in order to reduce the likelihood of the user abandoning the application. FIG. 5 illustrates one example of an intervention that may be used by the software application in the event the application determines the user abandonment score is above a threshold. As shown, compared to the screen shown in FIG. 4C, the software application may intervene by offering the user a discount via a pop-up message 502. The amount of the discount may be shown in box 504 and the updated total may be shown in box 506. Note, that while the above example in FIG. 5 illustrates an example of a real-time intervention, the software application can intervene when the user is off-line (e.g., not currently using the software application). For example, the software application can contact the user via e-mail, phone, or some other means to offer a coupon, discount, or other type of intervention.

Note that the interactive screens shown in FIGS. 4A-4C and FIG. 5 are provided herein as reference examples of the type of interfaces that may be presented to users and allow users to use voice/speech to control features of the application. More generally, those of ordinary skill in the art will recognize that other types of interfaces and/or formats of information can be used as well.

Figure 6:
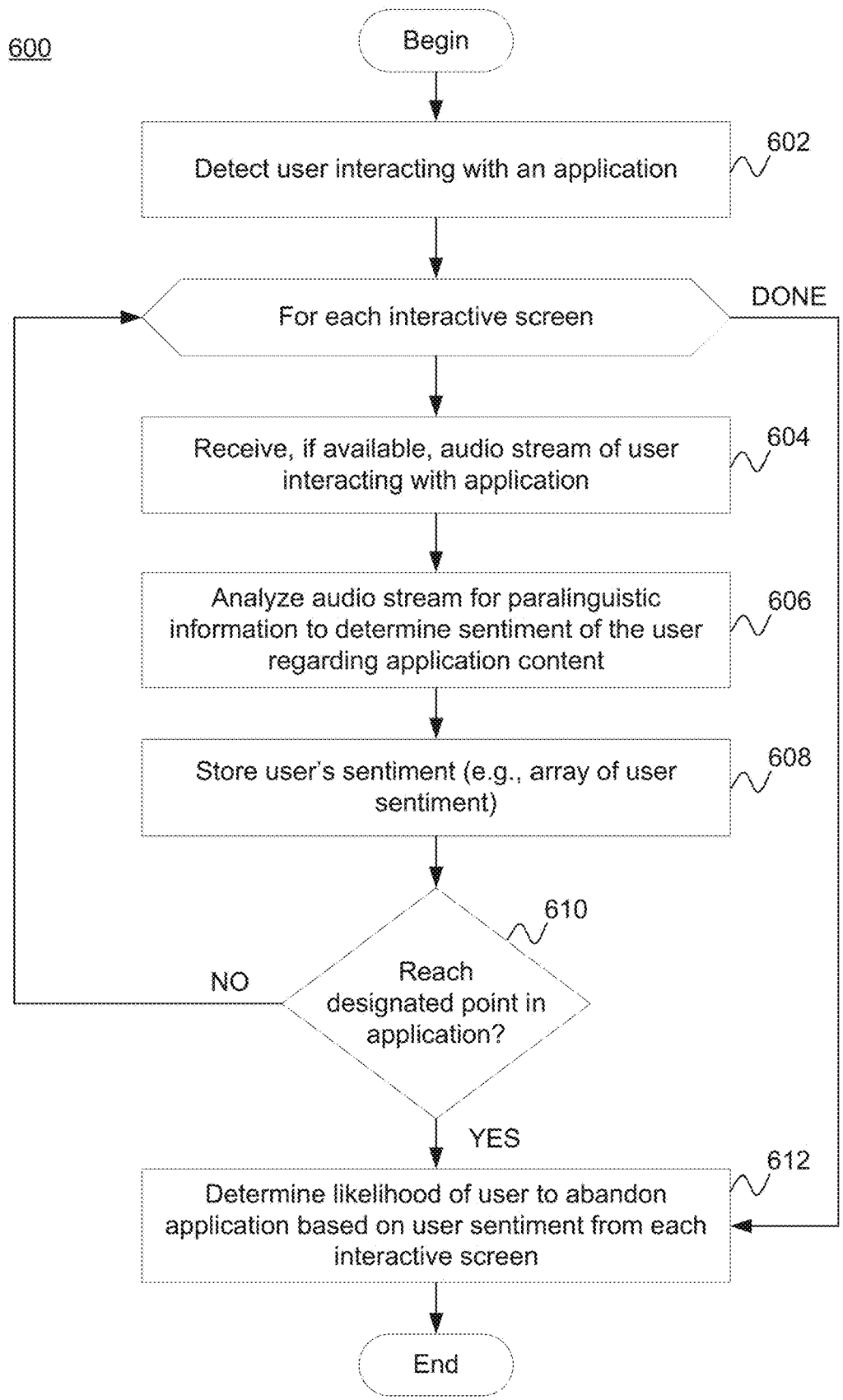
FIG. 6 illustrates a method for determining application experience of a user based on paralinguistic information of the user, according to one embodiment.

FIG. 6 illustrates a method 600 for determining application experience of a user based on paralinguistic information of the user, according to one embodiment. As shown, the method 600 begins at step 602, where the application (e.g., an online tax-preparation service) monitors (or detects) a user interacting with the application. For each interactive screen of the application, at 604, the application receives (if available) an audio stream comprising audio of the user indicative of feedback related to application content for the interactive screen. At 606, the application analyzes the audio stream for paralinguistic information to determine an emotional state (or sentiment) of the user to application content for the interactive screen. At 608, the application stores the user's sentiment (e.g., in a database, user profile located in the database, etc.). As noted above, in some cases, the user's sentiment may be stored as an array of emotional states per interactive screen.

At 610, the application determines if the user has reached a designated point in the application (e.g., such as the print-file screen for a tax-preparation application). If not, the application proceeds to perform steps 604-610 for a different interactive screen visited by the user. On the other hand, if so, the application, at 612, determines a likelihood of the user to abandon the application based on user sentiment from each interactive screen. As noted above, the application may use a propensity model to determine the likelihood of the user to abandon the application. For example, such a model may be trained based on correlations between user action (e.g., adoption, abandonment, etc.) at particular screens to users sentiment to one or more prior interactive screens of the application. In some embodiments, the application determines the likelihood of the user to abandon the application at any point during the user's interaction with the application (e.g., such as every screen that the user interacts with via voice/speech).

Figure 7:
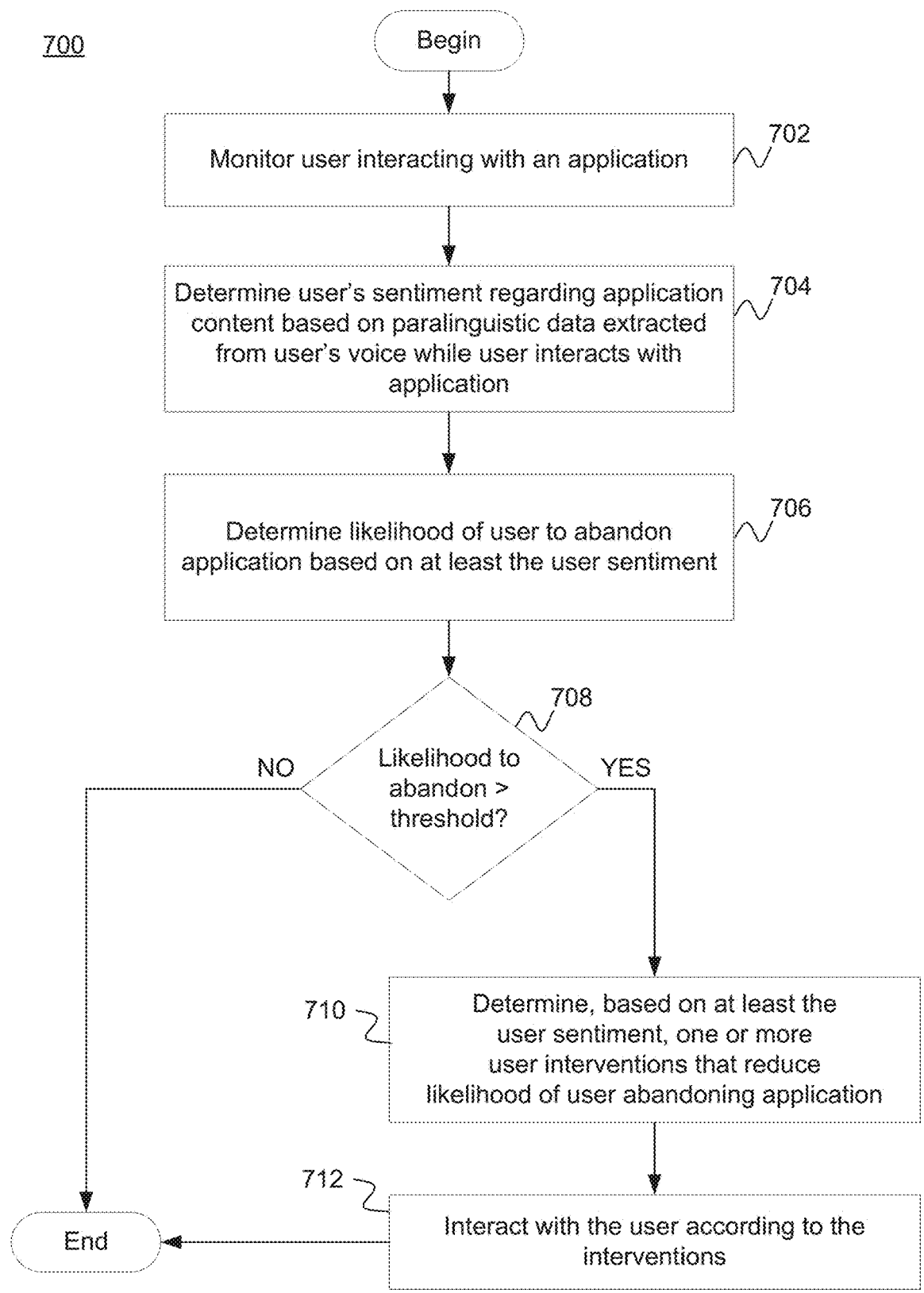
FIG. 7 illustrates a method for determining an intervention to prevent a user from abandoning the interactive computing service, according to one embodiment.

FIG. 7 illustrates a method 700 for determining one or more interventions for reducing likelihood of user abandonment, based on paralinguistic information of a user, according to one embodiment. As shown, the method 700 begins at step 702, where the application (e.g., an online tax-preparation service) monitors (or detects) a user interacting with an application. At 704, the application determines the user's sentiment regarding application content based on paralinguistic data extracted from the user's voice/speech while the user interacts with the application (e.g., one or more predetermined interactive screens).

At 706, the application determines a likelihood of the user to abandon the application based on at least the user's sentiment (e.g., using a propensity model). At 708, the application determines whether the user's likelihood to abandon the application satisfies a predetermined condition (e.g., is above a threshold in this particular embodiment). If not, the method 700 ends (i.e., the application may choose not to intervene since the user is not at-risk of abandoning). On the other hand, the application, at 710, determines, based on at least the user sentiment, one or more user interventions that reduce the likelihood of the user abandoning the application. As noted above, such interventions can include, but are not limited to, offering a discount, offering assisted support, offering self-support content, providing direct links to information content, etc. In one embodiment, the application may use an uplift model to determine the type of interventions. For example, as noted, the uplift model may be trained based on correlations between interventions to users' at a particular page (given the users' sentiment for particular interactive screens) and the users' reaction to the interventions. Once determined, the application, at 712, interacts with the user according to the interventions. For example, such interaction can be in real-time or when the user is off-line.

Figure 8:
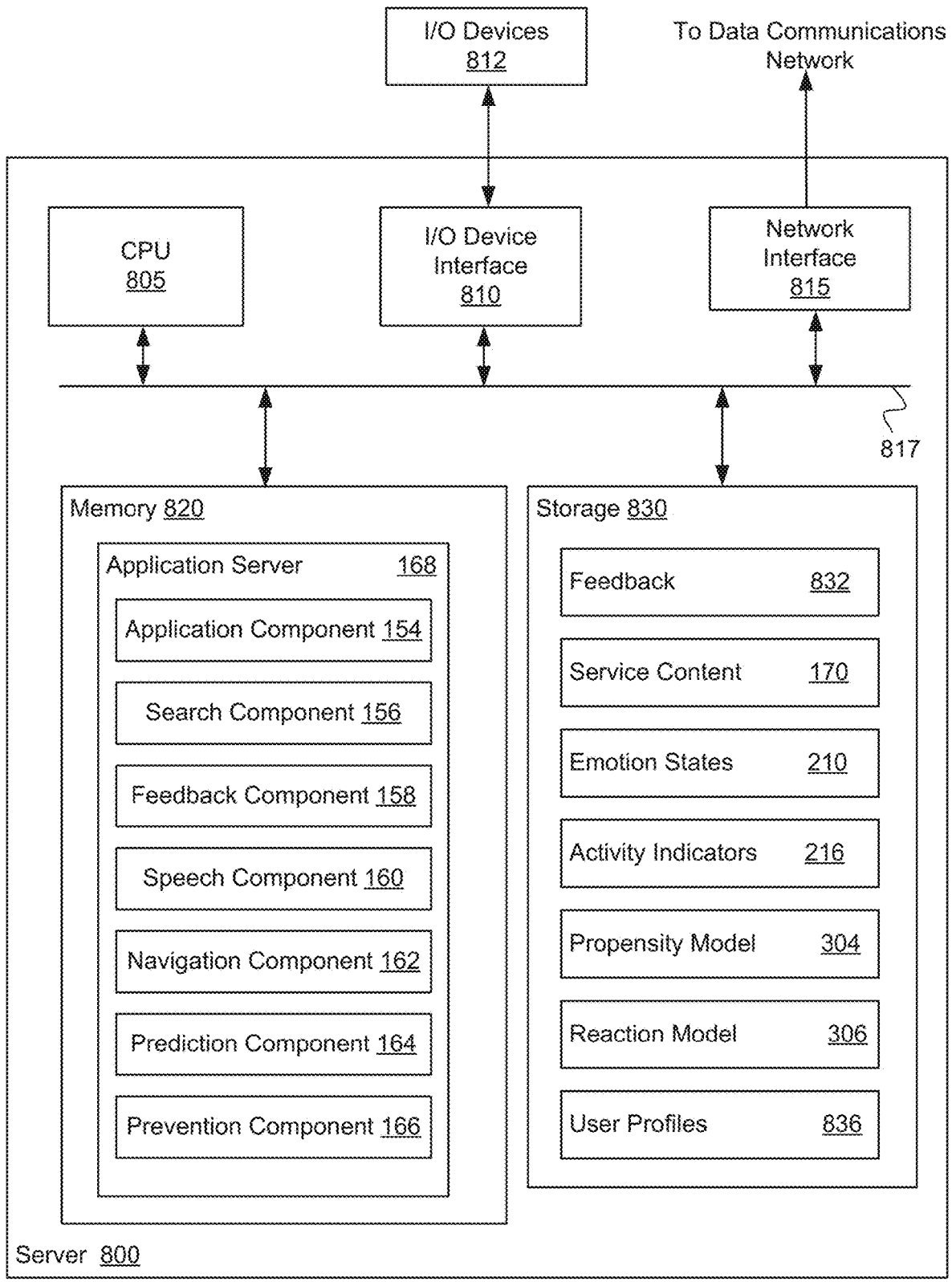
FIG. 8 illustrates an example computing system used to determine application experience of a user based on paralinguistic information, according to one embodiment.

FIG. 8 illustrates an example computing system 800 used to determine application experience of a user based on paralinguistic information of the user, according to one embodiment.

As shown, the computing system 800 includes, without limitation, a central processing unit (CPU) 805, a network interface 815, a memory 820, and storage 830, each connected to a bus 817. The computing system 800 may also include an I/O device interface 810 connecting I/O devices 812 (e.g., keyboard, display and mouse devices) to the computing system 800. Further, the computing elements shown in computing system 800 may correspond to a physical computing system (e.g., a system in a data center) or may be a virtual computing instance executing within a computing cloud.

The CPU 805 retrieves and executes programming instructions stored in the memory 820 as well as stored in the storage 830. The bus 817 is used to transmit programming instructions and application data between the CPU 805, I/O device interface 810, storage 830, network interface 815, and memory 820. Note, CPU 805 is included to be representative of a single CPU, multiple CPUs, a single CPU having multiple processing cores, and the like, and the memory 820 is generally included to be representative of a random access memory. The storage 830 may be a disk drive or flash storage device. Although shown as a single unit, the storage 830 may be a combination of fixed and/or removable storage devices, such as fixed disc drives, removable memory cards, optical storage, network attached storage (NAS), or a storage area-network (SAN).

Illustratively, the memory 820 includes an application server 168, which includes an application component 154, search component 156, feedback component 158, speech component 160, navigation component 162, prediction component 164, and prevention component 166, all of which are discussed in greater detail above. Further, storage 830 includes feedback 832, service content 170, emotion states 210, activity indicators 216, propensity model 304, reaction model 306 and user profiles 836.

Advantageously, the techniques presented herein allow an online service to track and determine user sentiment (based on paralinguistic information of a user's voice/speech) regarding different application content provided by the online service, and determine which users may be at risk of abandoning or discontinuing use of the online service. Additionally, the techniques presented herein can determine (based on the paralinguistic information) the set of interventions that can reduce the likelihood of the user abandoning the online service. As such, the techniques presented herein can be used to increase retention of customers.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for determining application experience of a user, comprising:
    receiving, at a computing device, an audio stream comprising audio of a user interacting with an application;
    extracting paralinguistic information from the audio stream, wherein the paralinguistic information characterizes acoustic aspects of the audio stream that are distinct from verbal content of the audio stream;
    determining, based on the paralinguistic information, a sentiment of the user;
    generating, based on the sentiment of the user and a propensity model, an abandonment score associated with a probability of the user discontinuing use of the application;
    determining, based on the abandonment score meeting a predetermined threshold, the user is predicted to discontinue using the application; and
    initiating an intervention to reduce a likelihood of the user discontinuing use of the application.

2. The computer-implemented method of claim 1, wherein initiating the intervention includes determining a type of intervention that reduces the likelihood of the user discontinuing use of the application.

3. The computer-implemented method of claim 2, wherein initiating the intervention comprises: modifying a user interface.

4. The computer-implemented method of claim 1, wherein the intervention comprises at least one of a real-time intervention or an off-line intervention.

5. The computer-implemented method of claim 1, wherein determining that the user is predicted to discontinue use of the application comprises:
    determining a current user sentiment regarding a first page from the paralinguistic information; and
    determining that the current user sentiment regarding the first page satisfies a predetermined condition for the determination that the user is predicted to discontinue use of the application.

6. The computer-implemented method of claim 5, wherein the current user sentiment regarding the first page comprises a plurality of emotional states predicted for the user based on the paralinguistic information.

7. The computer-implemented method of claim 1, wherein determining that the user is predicted to discontinue use of the application is further based on a predetermined priority associated with the application.

8. A computing device for determining application experience of a user, the computing device comprising:
    a memory; and
    a processor configured to:
        receive, at a computing device, an audio stream comprising audio of a user interacting with an application;
        extract paralinguistic information from the audio stream, wherein the paralinguistic information characterizes acoustic aspects of the audio stream that are distinct from verbal content of the audio stream;
        determine, based on the paralinguistic information, a sentiment of the user;
        generate, based on the sentiment of the user and a propensity model, an abandonment score representing a probability of the user discontinuing use of the application;
        determine, based on the abandonment score meeting a predetermined threshold, the user is predicted to discontinue using the application; and
        initiate an intervention to reduce a likelihood of the user discontinuing use of the application.

9. The computing device of claim 8, wherein initiating the intervention includes determining a type of intervention that reduces the likelihood of the user discontinuing use of the application.

10. The computing device of claim 8, wherein the intervention comprises at least one of a real-time intervention or an off-line intervention.

11. The computing device of claim 8, wherein the processor is configured to initiate the intervention by modifying a user interface.

12. The computing device of claim 8, wherein the processor is configured to determine that the user is predicted to discontinue use of the application by:
    determining a current user sentiment regarding a first page from the paralinguistic information; and
    determining that the current user sentiment regarding the first page satisfies a predetermined condition for the determination that the user is predicted to discontinue use of the application.

13. The computing device of claim 12, wherein the current user sentiment regarding the first page comprises a plurality of emotional states predicted for the user based on the paralinguistic information.

14. The computing device of claim 8, wherein the processor is configured to determine that the user is predicted to discontinue use of the application further based on a predetermined priority associated with the application.

15. A non-transitory computer-readable medium comprising instructions that when executed by a computing device cause the computing device to perform a method for determining application experience of a user, the method comprising:
    receiving, at a computing device, an audio stream comprising audio of a user interacting with an application;
    extracting paralinguistic information from the audio stream, wherein the paralinguistic information characterizes acoustic aspects of the audio stream that are distinct from verbal content of the audio stream;
    determining, based on the paralinguistic information, a sentiment of the user;
    generating, based on the sentiment of the user and a propensity model, an abandonment score representing a probability of the user discontinuing use of the application;

determining, based on the abandonment score meeting a predetermined threshold, the user is predicted to discontinue using the application; and initiating an intervention to reduce a likelihood of the user discontinuing use of the application.

16. The non-transitory computer-readable medium of claim 15, wherein initiating the intervention includes determining a type of intervention that reduces the likelihood of the user discontinuing use of the application.

17. The non-transitory computer-readable medium of claim 15, wherein the intervention comprises at least one of a real-time intervention or an off-line intervention.

18. The non-transitory computer-readable medium of claim 15, wherein initiating the intervention comprises modifying a user interface.

19. The non-transitory computer-readable medium of claim 15, wherein determining that the user is predicted to discontinue use of the application comprises:

determining a current user sentiment regarding a first page from the paralinguistic information; and determining that the current user sentiment regarding the first page satisfies a predetermined condition for the determination that the user is predicted to discontinue use of the application.

20. The non-transitory computer-readable medium of claim 19, wherein the current user sentiment regarding the first page comprises a plurality of emotional states predicted for the user based on the paralinguistic information.

* * * * *